United States Patent [19]

Marjollet et al.

[11] 4,280,825

[45] Jul. 28, 1981

[54] VERTICAL SEPARATOR FOR SEPARATING LIQUID OR SOLID PARTICLES FROM A VAPOR OR A GAS

[75] Inventors: Jacques Marjollet, Paris; Gérard Tondeur, Velizy-Villacoublay; Jean-Pierre Cerdan, Houilles; Patrick Talleu, Chatou, all of France

[73] Assignees: Stein Industrie, Velizy-Villacoublay; Electricite de France, Paris, both of France

[21] Appl. No.: 36,703

[22] Filed: May 7, 1979

[30] Foreign Application Priority Data

May 12, 1978 [FR] France ................................ 78 14212
Apr. 6, 1979 [FR] France ................................ 79 08784

[51] Int. Cl.$^3$ ................................ B01D 45/12

[52] U.S. Cl. ................................ 55/203; 55/347; 55/348; 55/416

[58] Field of Search ................ 55/191, 192, 199, 203, 55/344, 346, 347, 348, 416, 419

[56] References Cited

U.S. PATENT DOCUMENTS

| | | | |
|---|---|---|---|
| 1,333,325 | 3/1920 | McGee | 55/348 |
| 1,338,143 | 4/1920 | McGee | 55/348 X |
| 3,253,999 | 5/1966 | Weisman | 55/348 X |
| 3,520,114 | 7/1970 | Pall et al. | 55/348 X |
| 3,868,236 | 2/1975 | Meier et al. | 55/203 |
| 3,894,517 | 7/1975 | Meier | 55/348 X |
| 4,002,432 | 1/1977 | Brice et al. | 55/199 X |

FOREIGN PATENT DOCUMENTS

| | | | |
|---|---|---|---|
| 1021374 | 2/1953 | France | 55/348 |

*Primary Examiner*—John Adee
*Attorney, Agent, or Firm*—Sughrue, Rothwell, Mion, Zinn and Macpeak

[57] ABSTRACT

A vertical separator for separating liquid or solid particles from a mixture of the particles and a vapor or a gas, said separator including, inside an outer casing a chamber for admitting the mixture, a plurality of vertical tubes whose ends are provided with fixed blades which impart a helical movement to the mixture and whose outlets are provided with a coaxial tube whose diameter is smaller and which allows dry vapor or gas to be removed in an inner tube and a mixture containing a higher proportion of liquid or solid particles to be removed in the annular space which leads into a free chamber where said mixture which contains a higher proportion of liquid or solid particles is allowed to be separated into substantially dry vapor or gas and a fluid which contains little vapor or gas. At the bottom of said free chamber, the separator has an upwardly convex bottom, an annular space for collecting the fluid which has a low vapor or gas content and passages which are regularly disposed between the tubes and which allow the substantially particle-free vapor or gas to escape upwards. Application to drying steam.

11 Claims, 6 Drawing Figures

FIG. 4
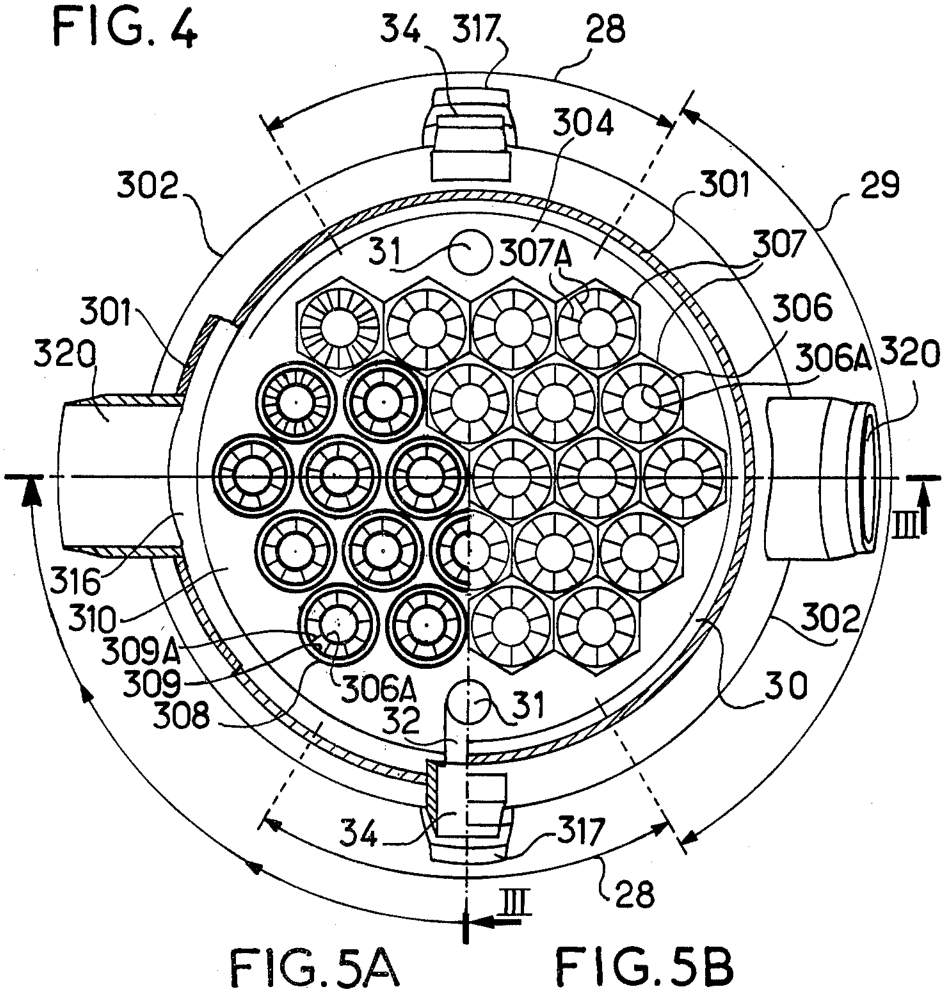
FIG.5A
FIG.5B
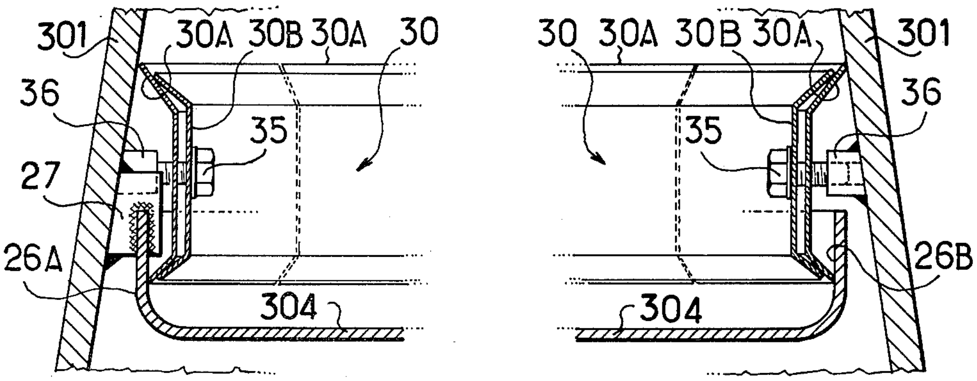

VERTICAL SEPARATOR FOR SEPARATING LIQUID OR SOLID PARTICLES FROM A VAPOR OR A GAS

BACKGROUND OF THE INVENTION

The present invention relates to a vertical separator for separating liquid or solid particles from a mixture of the particles and a vapour or a gas, said separator including, inside an outer casing, a chamber for admitting the mixture, a plurality of vertical tubes whose ends are provided with fixed blades which impart a helical movement to the mixture and whose outlets are provided with a coaxial tube whose diameter is smaller and which allows dry vapour or gas to be removed in an inner tube and a mixture containing a higher proportion of liquid or solid particles to be removed in the annular space which leads into a free chamber where said mixture contains a higher proportion of liquid or solid particles is allowed to be separated into substantially dry vapour or gas and a fluid which contains little vapour or gas, and said inner tubes leading into a dry vapour or gas collecting chamber.

Drying apparatus which uses centrifuging effects in tubes has the advantage of small bulk in comparison to the flow steam to be treated, and can therefore be disposed directly at the outlets of apparatus which generates wet steam, (such as expansion turbines) thereby omitting or reducing the length of tubing which conveys wet steam, and is consequently subjected to erosion and corrosion. Such apparatus provides dry steam with a low residual water content of about 0.1% and consequently reduces as much as possible the volume of water retained in the steam circuits, which water is liable to be vaporized when the steam pressure drops. However, the separated water is still mixed with steam and even if it enters a chamber which allows further separation by gravity, such separation is incomplete. The water which streams down entrains a quantity of steam which is lost from the thermodynamic cycle. This reduces the efficiency of the downstream equipment (expansion turbines, heat exchangers). The steam which rises in the chamber further entrains droplets of water so that the steam can be used only with difficulty unless precautions are taken and there is a danger of its causing corrosion on its circuit or requiring the use of expensive stainless steel tubes.

SUMMARY OF THE INVENTION

The present invention aims to remedy the above disadvantages and to provide a vertical separator which produces firstly dry vapour or gas with a low residual content of liquid or solid particles and secondly an extra fraction of vapour or gas free from the greater part of the residual liquid or solid particles, said dry vapour or gas then containing only a few percent of residual particles in thermodynamic circuits without any particular precaution being taken. It also aims, in the case of separation of a mixture of vapour or gas and a liquid, to reduce as much as possible the quantity of liquid vaporized when there is a pressure drop in the vapour or the gas and to reduce the loss of head on the dry vapour or gas circuit as well as the general bulk of the separator.

The separator according to the invention is characterized in that at the bottom of said free chamber, the separator has an upwardly convex bottom, an annular space for collecting the fluid which has a low vapour or gas content and passages which are regularly disposed between the tubes and which allow the substantially particle-free vapour or gas to escape upwards.

It further includes preferentially at least one of the following characteristics:

the chamber for collecting dry vapour or gas is connected by its bottom to a tube for removing the dry vapour or gas, said tube being inclined sideways away from the axis of the separator with a large radius of curvature;

the annular space for collecting fluid with a low vapour or gas content has a small volume and is connected to a receptacle which has a large volume and which collects said fluid exterior to the separator;

said annular space is connected to the collecting receptacle by a plurality of tubes which are regularly spaced out round its periphery;

it includes a plurality of side tubes for removing substantially dry vapour or gas which have escaped upwards between said vertical tubes which are regularly spaced out round its periphery;

the assembly formed by the inlet chamber, the vertical separation tubes and the convex bottom rests by the lower edges of said convex bottom on a ring welded to the outer casing of the separator;

the assembly formed by the inlet chamber and the free chamber around the vertical separation tubes is surrounded by an inner casing made of a metal which withstands erosion and corrosion by wet steam which flows at high speed, and is integral with the convex bottom and in that the outer casing is made of a metal which does not withstand erosion and corrosion by wet steam flowing at high speed;

it includes a single casing which directly surrounds the mixture inlet chamber and the free chamber round the separation tubes and in that the flat spacer plate which separates the inlet chamber from the free chamber around the tubes has an upturned rim welded to said outer casing round at least part of its periphery;

said upturned edge is welded on the outer casing in the sectors where the vertical tubes are relatively far from the edge of said flat spacer plate and it remains free in the sectors where the vertical tubes are relatively close to the edges of said flat spacer plate;

at least in the sectors where they are not welded together the gap between the upturned edge of the flat spacer plate and the outer casing is covered by resilient sealing strips fixed to said outer casing at intervals;

the periphery of said flat spacer plate has orifices connected to angle tubes for removing any water which is deposited in the casing to the outside thereof; and said angle tubes have expansion bellows in vertical portions close to said flat spacer plate.

BRIEF DESCRIPTION OF THE DRAWINGS

Two embodiments of the invention are described hereinbelow in greater detail and by way of example with reference to the accompanying drawings, in which:

FIG. 4 is a diametral cross-section along axis IV—IV of FIG. 3;

FIG. 5A is an enlarged section view which illustrates detail A of FIG. 3; and

FIG. 5B is an enlarged, sectional view which illustrates detail B of FIG. 3.

DESCRIPTION OF THE PREFERRED EMBODIMENTS

Figure 1:
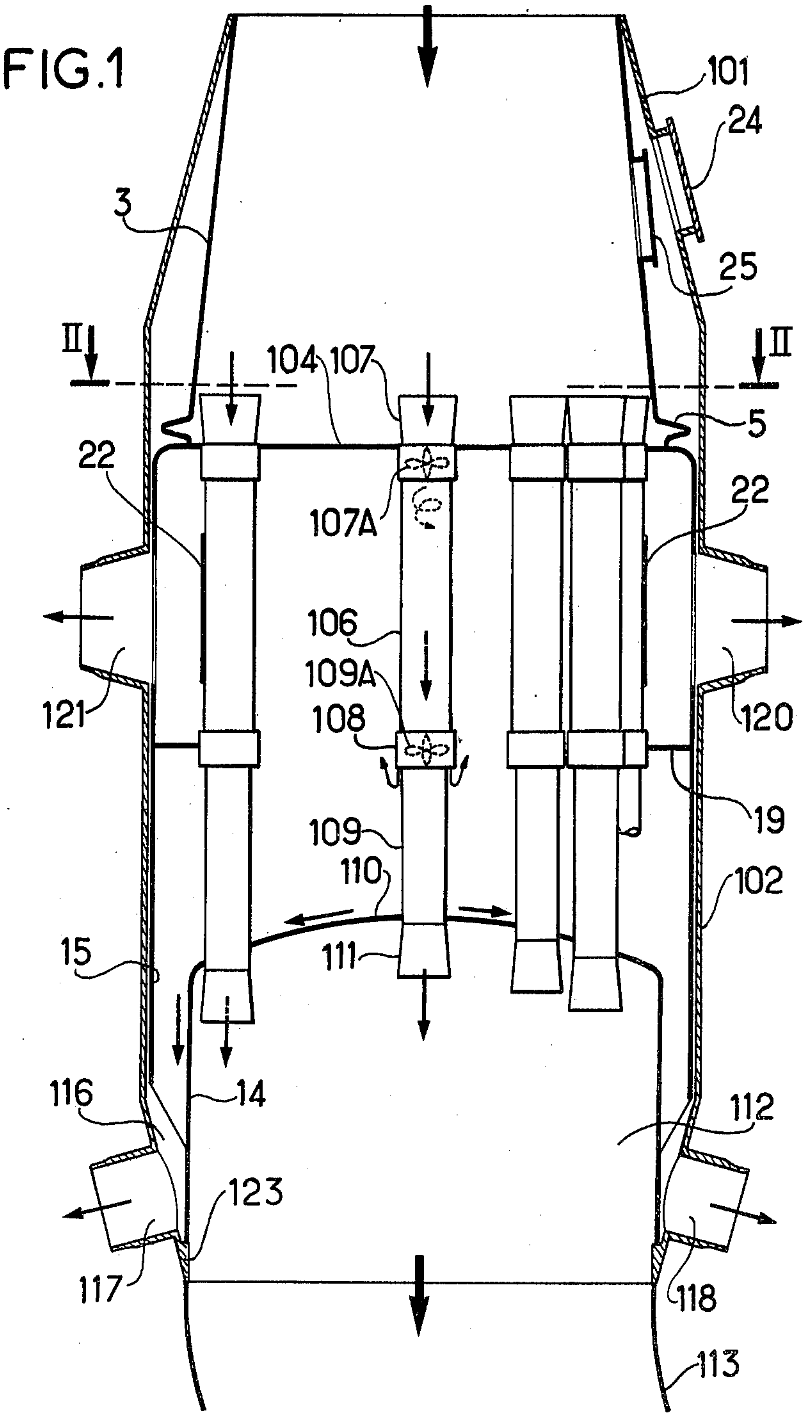
FIG. 1 is an axial cross-section of a separator in accordance with the invention.

In FIG. 1, the carbon steel outer casing of the separator includes a frusto-conical upper portion 101, followed by a cylindrical portion 102. A stainless steel inlet sleeve 3, to which a separation tube spacer plate 104 is fixed via an expansion seal 5, is welded inside the frusto-conical portion. Separation tubes 106 include flared inlet orifices 107 fixed edge to edge in the form of a honeycomb configuration (see FIG. 2). Near their inlets, the tubes 106 are provided with separator units 107A which cause the flow of wet steam to spin. At their lower ends, these units have means 108 for separating the centrifuged water from the dry steam, which enters an inner tube 109 which has a smaller diameter. The tubes 9, provided with flow de-spin means 109A, are welded on a rounded bottom 110 and lead through to the outer side thereof via openings 111 into a dry steam plenum chamber 112 which is connected to a dry steam removal tube 113 which has a large radius of curvature, so as to reduce the loss of head as much as possible on the dry steam circuit.

The rounded bottom 110 constitutes the upper end of a cylindrical casing 14 which is welded on a ring 123 which is itself welded inside the outer casing.

The spacer plate 104 is fixed to an outer casing 15 which is also made of stainless steel and whose lower portion defines, with the inner casing 14, an annular space 116 for collecting the separated water. The space is connected by tubes 117 and 118, at 180° to each other, to a large volume outer receptacle (not shown) for containing the separated water. In this way, in the case of a pressure drop on the wet steam circuit, the quantity of water which is liable to be revaporized is not very great.

Further, a peripheral metal sheet 19 surrounds the separator means 108, so as to prevent steam mixed with water from returning towards tubes 120 and 121 for removing the substantially dry steam which rises between the tubes 106 from the means 108. The tubes 120 and 121 are at 180° to one another. Their discharges of substantially dry steam are homogenized by means of deflectors such as 22 which face the outlet tubes.

The separator operates as follows:

The wet steam arrives travelling vertically downwards in the sleeve 3 and is distributed equally among the various tubes by means of the hexagonal orifices 107 of the tubes 106. The wet steam falls in the tubes 106 after a spin movement has been imparted thereto by the units 107A. Due to centrifugal force, the droplets of water are thrown against the inner walls of the tubes down which they trickle. Level with the outlet of the separator means 108, the dry steam which remains in the axial zone of the tubes enters the tubes 109 of smaller diameter, in which the spin movement is cancelled by the de-spin means 109A, then passes through the rounded bottom 110 and gathers in the plenum chamber 112, whence it is sent to the load via the tube 113 of large radius of curvature.

Relatively dry steam escapes from the mixture of water and steam which escapes between the tubes 108 and 109 and its spin movement is cancelled by components which are not shown. The relatively dry steam then rises between the tubes 106, passing through slots (not shown) of definite width provided between these tubes and is sent to the load via the tubes 120 and 121. The remaining water gathers in streams which fall along the outer periphery of the tubes 109 towards the rounded bottom 110. The water then streams over the rounded bottom towards its periphery, where it gathers in the annular space 116 whence it is removed via the tubes 117 and 118 at 180° to each other, towards the receptacle (not shown) for receiving water. It will be observed that once the water has been separated from the steam at the separating means 108, the water and the steam flow along entirely different paths, one downwards, the other upwards, and that therefore there is no danger of further mixture between the water and the steam. Further, the differential expansion of the whole of the apparatus resting on the lower ring 23 is absorbed by the expansion seal 5 of the sleeve 3. Manholes 25, 26 are advantageously disposed on the frusto-conical portion 1 of the casing and on the sleeve 3 for maintenance of the inlets of the tubes 106.

Figure 3:
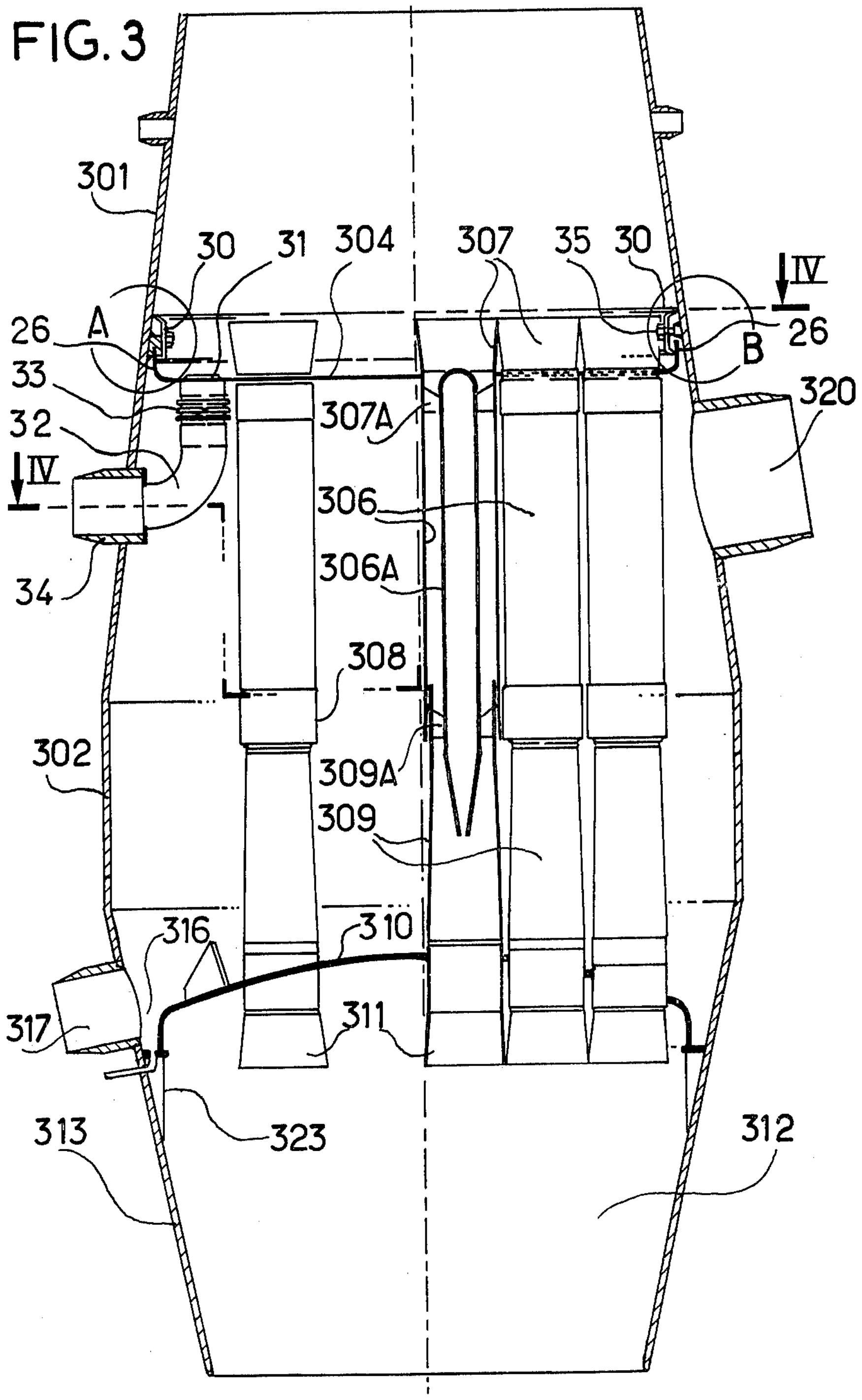
FIG. 3 is an axial cross-section of another embodiment along III—III in FIG. 4, with part of the cross-section turned down.

In FIG. 3, the stainless steel separator casing which withstands the erosion and corrosion action of high-speed wet steam includes a frusto-conical portion 301 on the wet steam inlet side, a cylindrical central portion 302 and a frusto-conical portion 313 On the dry steam outlet side. The spacer plate 304 for the separation tubes 6 includes an upturned rim 26 welded on one portion of its periphery inside the casing and free on the other portion thereof, as will be described hereinafter in greater detail.

Figure 2:
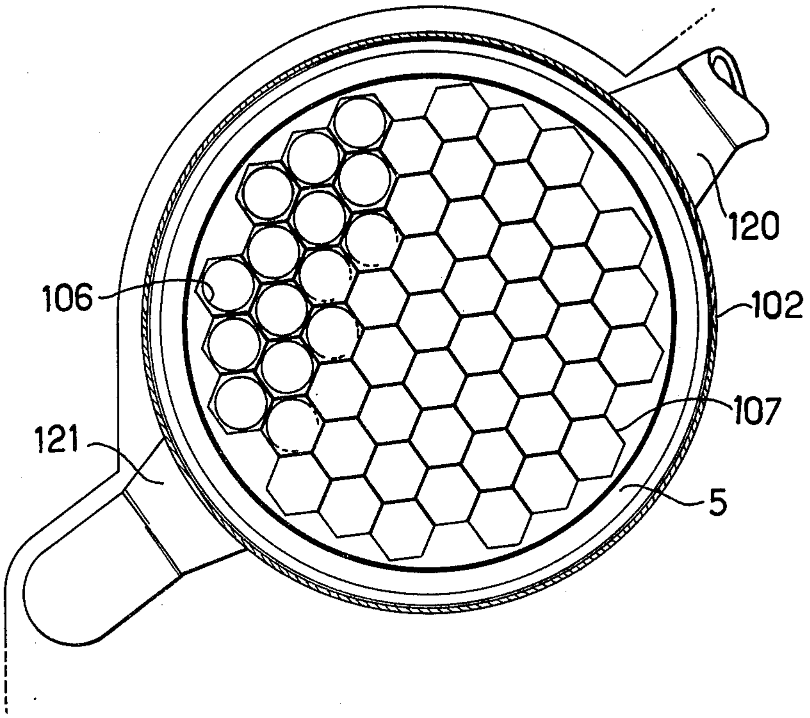
FIG. 2 is a diametral cross-section along axis II—II in FIG. 1.

The separation tubes 306 are of circular cross-section and end above the spacer plate 304 in flared inlet orifices 7 fixed edge to edge and form a honeycomb configuration (see FIG. 2).

Their inlets are provided with sets of inclined blades 307A fixed on axial mandrels 306A, said blades imparting a helical spinning flow to the wet steam. At their lower ends 308, they include outlets for separating the centrifuged water from the dry steam. The dry steam enters an inner tube 309 whose inlet is of smaller diameter than the tube 306. The tubes 309 are provided with blades 309A for de-spinning the flow of dry steam and are flared in a frusto-conical shape so as to slow down the dry steam. They are welded to the rounded bottom 310 and end in flared outlet openings 311 which as a whole form a honeycomb configuration analogous to that of the inlet orifices 307 and leading into chamber 312 for gathering the dry steam which is gathered at a dry steam removal tube, not shown.

The rounded bottom 310 is welded onto a ring 323 which is itself welded to the outer casing and which therefore supports all the separation tubes as a whole.

The outer casing is provided with tubes 317 for removing the separated water towards a spherical collecting chamber (not shown) and with tubes 320 for removing steam from which part of the water has been removed.

The structure of the flat spacer plate 304 is more clearly shown in FIGS. 4, 5A and 5B. It is welded to the outer casing 301 by means of brackets 27 which engage in notches in the rim 26A (see FIG. 5A), along two sectors 28 which form an angle of 50°, in the zones where the tubes are relatively far away from the rim of the spacer plate. In contrast, its rim 26B is free round the rest of the periphery (FIG. 5B) in the zones 29 where the tubes are closer to the rim of the spacer plate. To prevent leakage of wet steam along the spacer plate, the upper portion of the rim is covered by a double sealing plate 30A, 30B, bolted at intervals and tightened by nuts 35 on lugs 36 welded to the casing (see FIGS. 5A and 5B).

Since some of the water is separated from the steam already before the mixture of water and steam enters the separation tubes 306, the flat spacer plate 304 has orifices 31 for removing the water which is deposited thereon. The orifices lead to angle tubes 32 for removing the water, said angle tubes being provided with expansion bellows 33 and leading to the outside of the casing via a tube 34. The tubes 32 are connected to the same spherical collecting chamber as the tubes 317, via U tubes which compensate for the difference in pressure.

Although the separators which have just been described with reference to the figures appear to be the preferential embodiments, it will be understood that various modifications can be made thereto without going beyond the scope of the invention, it being possible to replace some of their components by others which would perform an analogous technological function. In particular, the components for imparting a spin movement to the wet steam, as well as those for cancelling the spin movement, both of the dry steam and of the water at the bottom of the tubes may have any suitable shape. The rounded bottom which separates the chamber containing the liquid from the steam plenum chamber can be replaced by a conical bottom.

The invention applies more particularly to separators for separating wet steam into dry steam and residual water, in particular in electric power production plants. However, it can also be applied more generally to the separation of liquid or solid particles conveyed by a vapour or by a gas.

We claim:

1. A vertical separator for separating liquid or solid particles from a mixture of the particles and a vapour or gas, said separator including, a cylindrical outer casing, a transverse spacer plate expanding across the interior of said outer casing and defining an upper chamber inside said outer casing for admitting the mixture, a plurality of vertical tubes, said tubes having ends protruding upwardly through said spacer plate and being provided with fixed blades at said ends which impart a helical movement to the mixture and outlets at their lower ends for said tubes provided with a coaxial tube of reduced diameter and being an inner tube which allows dry vapour or gas to be removed by said inner tube and a mixture containing a higher proportion of liquid or solid particles to be removed in the annular space between said inner and outer tubes which leads into a free chamber where said mixture containing a higher proportion of liquid or solid particles is separated into substantially dry vapour or gas and a fluid which contains little vapour or gas, and said inner tubes leading into a dry vapour or gas collecting chamber, the improvement wherein at the bottom of said free chamber, the separator has an upwardly convex bottom forming with said outer cylindrical casing a narrow annular space for collecting the fluid which has a low vapour or gas content and passages which are regularly disposed between the tubes and which allow the substantially particle-free vapour or gas to escape upwards between said vertical tubes, and discharge tubes opening radially through said outer casing to said free chamber, above said narrow annular space, for removing said substantially dry vapour or gas.

2. A separator according to claim 1, wherein the chamber for collecting dry vapour or gas is connected by its bottom to a dry vapour or gas removal tube for removing the dry vapour or gas, said dry vapour or gas removal tube being inclined sideways away from the axis of the separator with a large radius of curvature.

3. A separator according to claim 1, wherein the annular space for collecting fluid with a low vapour or gas content is connected to the collecting receptacle by a plurality of collecting tubes which are regularly spaced out round its periphery.

4. A separator according to claim 1, wherein said discharge tubes which open radially through said outer casing comprise a plurality of side tubes for removing substantially dry vapour or gas which has escaped upwards between said vertical tubes which are regularly spaced out around its periphery.

5. A separator according to claim 1, further comprising an assembly formed by said spacer plate, an inlet sleeve, an expansion seal at the bottom of said inlet plate, the vertical separation tubes and the convex bottom of said assembly resting by way of a lower edge of said convex bottom on a ring welded to the outer casing of the separator.

6. A separator according to claim 1, wherein an assembly formed by the inlet chamber and the free chamber around the vertical separation tubes is surrounded by an inner casing made of a metal which withstands erosion and corrosion by wet steam which flows therethrough at high speed, and is integral with the convex bottom and in that the outer casing is made of a metal which does not withstand erosion and corrosion by wet steam flowing at high speed.

7. A separator according to claim 1, wherein a single casing directly surrounds the mixture inlet chamber and the free chamber around the separation tubes and wherein said flat spaced plate which separates the inlet chamber from the free chamber around the tubes has an upturned rim welded to said outer casing around at least part of its periphery.

8. A separator according to claim 7, wherein said upturned edge is welded on the outer casing in the sectors where the vertical tubes are relatively remote from the edge of said flat spacer plate and wherein it remains free in the sectors where the vertical tubes are relatively close to the edges of said flat spacer plate.

9. A separator according to claim 8, wherein the gap between the upturned edge of the flat spacer plate and the outer casing is covered by resilient sealing strips fixed to said outer casing at intervals.

10. A separator according to claim 7, wherein the periphery of said flat spacer plate has orifices connected to angle tubes for removing any water which is deposited in the casing to the outside thereof.

11. A separator according to claim 10, wherein said angle tubes have expansion bellows in vertical portions close to said flat spacer plate.

* * * * *